Patented Mar. 8, 1932

1,848,127

UNITED STATES PATENT OFFICE

THOMAS PERCY HILDITCH, OF GRAPPENHALL, AND HAROLD JOSEPH WHEATON, OF LOWER WALTON, NEAR WARRINGTON, ENGLAND, ASSIGNORS, BY MESNE ASSIGNMENTS, TO AMERICAN DOUCIL COMPANY, OF PHILADELPHIA, PENNSYLVANIA, A CORPORATION OF PENNSYLVANIA

MANUFACTURE AND PRODUCTION OF BASE-EXCHANGING COMPOUNDS

No Drawing. Application filed August 13, 1923, Serial No. 657,206, and in Great Britain August 14, 1922.

This invention relates to the production of base-exchanging compounds, or gels, especially applicable to the purification and softening of water, but not necessarily limited thereto.

In the specifications of British Letters Patent Nos. 142,974 and 177,746 granted to the said Harold Joseph Wheaton and Joseph Crosfield and Sons, Limited, are described and claimed the manufacture and production of base-exchanging compounds, in the case of the former specification, by treating a solution of silicate of sodium with an acid, so as to neutralize a portion of the sodium, and afterwards drying the gel and washing it to free it from soluble salt and, in the case of the latter specification, by the employment of solutions of sodium silicate and sodium aluminate in such proportions and under such conditions as to produce a base-exchanging compound on subsequent treatment analogous to that employed in the former case.

We have now found that very efficient base-exchanging compounds can be made by mixing with a solution of sodium silicate a solution of certain sodium compounds being what may be defined as acidic sodium salts, or salts of complex, or condensed, acids (other than sodium aluminate) such as sodium pyroborate, or borax, sodium dichromate, sodium bicarbonate, sodium metaphosphate, sodium dihydrogen phosphate, sodium pyrosulphate, sodium bisulphate, or sodium bisulphite, such salts being alkali metal salts in which the simple alkali metal oxide to acid anhydride ratio is smaller than the corresponding ratio in the normal alkali metal salt of the same constituents. Or we may mix with the sodium silicate solution solutions of more than one other salt; such, for example, as solutions of sodium aluminate and sodium pyroborate, or of sodium aluminate and sodium dichromate, or of sodium pyroborate and sodium dichromate, or of sodium bicarbonate and sodium dichromate, or other combinations of the aforesaid salts.

The proportion to the sodium silicate of the sodium compound, or compounds, thus added will vary, according to the compound, or compounds, employed say from one molecular proportion of the acidic oxide of such added compound, or compounds, to from one molecular proportion to five molecular proportions of silica.

The concentration of the solutions may be, for instance, from about 10° to 29°, Twaddell for the solution of the added compound, or compounds, when the solubility of the compound in cold water permits. For compounds of comparatively low solubility a saturated solution may be used and the strength may be varied; for example, a convenient strength is up to 15° Twaddell, (according to the constituents used) for each solution, or so that the stiff gel, resulting from the mixed solutions, contains between 5 and 15 per cent of its weight of total solids.

Although we herein mentioned only sodium salts it is to be understood that, where it is available, potassium silicate can be used and also that where they are available, the corresponding potassium, or ammonium, salts may be used to mix with the silicate as aforesaid. As, in using these other salts, it will be understood that the amount thereof chemically equivalent to the sodium salts will be used it is unnecessary to give examples of the use of the other salts.

The following are examples of how our invention may be performed but we do not limit ourselves to the precise details of these examples. The parts are by weight and the mixing is presumed to be done at atmospheric temperature.

Example 1

Mix 2,730 parts of a solution of sodium silicate (containing 333 parts of silica and 111 parts of sodium oxide), with a saturated solution of 456 parts by weight of crystallized borax. This mixed solution will contain about 6 grams of solids per 100 cubic centimetres and will set to a thin homogeneous gel in about from half an hour to an hour. After standing for a day, during which time it becomes more stiff, the gel is dried and afterwards washed. The drying should be slowly and gently effected in a current of warm air so as to preserve as nearly as possible the physical structure. When the gel becomes hard it is washed in a current of water to remove the soluble salts under which treatment it will break down from lumps into granules.

Example 2

Mix 3,750 parts of a solution of sodium silicate (containing 321 parts of silica and 111 parts of sodium oxide) with 3,500 parts of a solution containing 356 parts of sodium dichromate. The foregoing silicate solution is of about 16° Twaddell and the content of solids in the mixed solutions is about 11 per cent. On mixing, the reddish-orange colour of the dichromate changes rapidly to the pale yellow of the normal monochromate, and, in about two minutes, the solution sets to a stiff gel which is left to stiffen further and is then dried and washed as aforesaid.

Example 3

Mix 3,730 parts of a solution of sodium silicate (containing 333 parts of silica and 111 parts of sodium oxide) with 3,600 parts of a solution containing 300 parts of sodium bicarbonate the content of solids in the mixed solutions being about 10 per cent. The mixture will set to a firm homogeneous gel in about one minute and, after standing, is dried and washed as aforesaid.

Example 4

Mix 2,730 parts of a solution of sodium silicate (containing 333 parts of silica and 111 parts of sodium oxide) with 2,000 parts of a solution containing 183 parts of sodium metaphosphate (such as may be produced, for example, by heating microcosmic salt sufficiently to maintain it in a fused condition until decomposition into sodium metaphosphate is complete). The mixture contains about 13.3 per cent of solids in solution and will, in a few minutes, set to a firm homogeneous gel which is then washed and dried as aforesaid.

Example 5

Mix 1,365 parts of a solution of sodium silicate (containing 166.5 parts of silica and 55.5 parts of sodium oxide) with 1,000 parts of a solution containing 122 parts of sodium di-hydrogen phosphate. The mixture will set rapidly to a firm gel which is then washed and dried as aforesaid.

Example 6

Mix 2,730 parts of a solution of sodium silicate (containing 333 parts of silica and 111 parts by weight of sodium oxide) with 2,000 parts of a solution containing 300 parts of sodium pyrosulphate. The mixture will set rapidly to a gel which is then washed and dried as aforesaid.

Example 7

Mix the same amount of the silicate solution mentioned in Example 6 with 2,000 parts of a solution containing 250 parts of sodium bisulphate. In the course of a few minutes a homogeneous gel is produced which is dried and washed as aforesaid.

Example 8

Mix the same amount of the silicate solution mentioned in Example 6, with 2,000 parts of a solution containing 279 parts of sodium bisulphite. A homogeneous gel is rapidly produced which is washed and dried as aforesaid.

Example 9

Mix, simultaneously, 100 parts of a solution of sodium silicate (containing 19.8 parts of silica and 6.1 parts of sodium oxide) with 280 parts of a solution containing 15 parts of sodium dichromate and with 310 parts of a solution containing 20 parts of crystallized borax. The mixture will, in the course of about an hour, to one and a half hours, set to a homogeneous gel, which is allowed to stand for about a day, and is then dried and washed as aforesaid.

Example 10

Mix, simultaneously, 100 parts of a solution of sodium silicate (containing 19.8 parts of silica and 6.1 parts of sodium oxide) with 280 parts of a solution containing 15 parts of sodium dichromate and with 43 parts of a solution containing 4 parts of sodium bicarbonate. The mixture will set to a gel in the course of about half an hour and the gel is then washed and dried as aforesaid.

Example 11

Mix 2,400 parts of a solution of sodium silicate (containing 180 parts of silica and 60 parts of sodium oxide) with 6000 parts of a solution containing 308 parts of crystallized borax and to this add immediately (while well stirring), 1,600 parts of a solution of sodium aluminate containing 54 parts of alumina and 54 parts of sodium oxide. There will thus be produced a loose homogeneous gel, which is dried and washed as aforesaid.

Example 12

Mix 5,600 parts of sodium silicate solution (containing 266 parts of silica and 89 parts of sodium oxide) with 1,800 parts of a solution containing 136 parts of sodium bicarbonate and immediately mix the resulting mixed solutions with 1,600 parts of a solution containing 54 parts of alumina and 54 parts of sodium oxide. The product is a gel which is dried and washed as aforesaid.

Example 13

Mix, simultaneously, 5,400 parts of sodium silicate solution (containing 180 parts of silica and 60 parts of sodium oxide) 1,600 parts of sodium aluminate solution, containing 54 parts of alumina and 54 parts of sodium oxide, and 2,500 volumes of a solution, containing 240 parts of sodium dichromate. The resulting gel is dried and washed as aforesaid.

We claim:

1. In the method of manufacturing a base-exchanging compound in the wet way, mixing a solution of an alkali-metal silicate with a solution of an alkali metal salt containing one or more replaceable hydrogen atoms capable of combining with additional alkali metal under conditions, proportions and degrees of concentration which result in the formation of a stiff or solid gel and then in drying the gel so produced.

2. In the method of manufacturing a base-exchanging compound in the wet way, mixing a solution of an alkali-metal silicate with a solution of an alkali metal salt containing one or more replaceable hydrogen atoms capable of combining with additional alkali metal under conditions, proportions and degrees of concentration which result in the formation of a stiff or solid gel, in drying the gel so produced and in washing the dried product.

3. As a new article of manufacture the product of claim 1.

4. As a new article of manufacture the product of claim 2.

5. As a new article of manufacture, a base-exchanging compound which has been produced from a stiff or solid gel resulting from the mixture, under completely gelatinizing conditions, proportions and degrees of concentration, of a solution of an alkali metal silicate with a solution of an alkali metal salt containing one or more replaceable hydrogen atoms capable of combining with additional alkali metal.

6. In the method of manufacturing a base-exchanging compound in the wet way, mixing a solution of an alkali-metal silicate with a solution of an alkali metal salt in which the simple alkali metal oxide to acid anhydride ratio is smaller than the corresponding ratio in the normal alkali metal salt of the same constituents under conditions, proportions and degrees of concentration which result in the formation of a stiff or solid gel and then in drying the gel so produced.

7. In the method of manufacturing a base-exchanging compound in the wet way, mixing a solution of an alkali-metal silicate with a solution of an alkali metal salt in which the acid simple alkali metal oxide to acid anhydride ratio is smaller than the corresponding ratio in the normal alkali metal salt of the same constituents under conditions, proportions and degrees of concentration which result in the formation of a stiff or solid gel, in drying the gel so produced and in washing the dried product.

8. As a new article of manufacture, the product of claim 6.

9. As a new article of manufacture, the product of claim 7.

10. As a new article of manufacture, a base-exchanging compound which has been produced from a stiff or solid gel resulting from the mixture, under completely gelatinizing conditions, proportions and degrees of concentration, of a solution of an alkali metal silicate with a solution of an alkali metal salt in which the simple alkali metal oxide to acid anhydride ratio is smaller than the corresponding ratio in the normal alkali metal salt of the same constituents.

11. In the method of manufacturing a base-exchanging compound in the wet way, mixing a solution of an alkali-metal silicate with a solution of sodium bicarbonate under conditions, proportions and degrees of concentration which result in the formation of a gel and then in drying the gel so produced.

12. In the method of manufacturing a base-exchanging compound in the wet way, mixing a solution of an alkali-metal silicate with a solution of sodium bicarbonate under conditions, proportions and degrees of concentration which result in the formation of a gel and then in drying the gel so produced and finally in washing the dried product.

13. As a new article of manufacture the product of claim 11.

14. As a new article of manufacture the product of claim 12.

15. In the method of manufacturing a base-exchanging compound in the wet way, mixing a solution of an alkali-metal silicate with a solution of sodium meta-phosphate under conditions, proportions and degrees of concentration which result in the formation of a gel and then in drying the gel so produced.

16. In the method of manufacturing a base-exchanging compound in the wet way, mixing a solution of an alkali-metal silicate with a solution of sodium meta-phosphate under conditions, proportions and degrees of concentration which result in the formation of a gel and then in drying the gel so produced and finally in washing the dried product.

17. As a new article of manufacture the product of claim 15.

18. As a new article of manufacture the product of claim 16.

19. In the method of manufacturing a base-exchanging compound in the wet way, mixing a solution of an alkali-metal silicate with a solution of sodium bi-sulphate under conditions, proportions and degrees of concentration which result in the formation of a gel and then in drying the gel so produced.

20. In the method of manufacturing a base-exchanging compound in the wet way, mixing a solution of an alkali-metal silicate with a solution of sodium bi-sulphate under conditions, proportions and degrees of concentration which result in the formation of a gel and then in drying the gel so produced and finally in washing the dried product.

21. As a new article of manufacture the product of claim 19.

22. As a new article of manufacture the product of claim 20.

In testimony whereof we have signed our names to this specification.

THOMAS PERCY HILDITCH.
HAROLD JOSEPH WHEATON.

CERTIFICATE OF CORRECTION.

Patent No. 1,848,127.                                  Granted March 8, 1932, to

THOMAS PERCY HILDITCH ET AL.

It is hereby certified that error appears in the printed specification of the above numbered patent requiring correction as follows: Page 1, line 56, for "10°" read 15°; page 3, line 58, claim 7, strike out the word "acid"; and that the said Letters Patent should be read with these corrections therein that the same may conform to the record of the case in the Patent Office.

Signed and sealed this 5th day of April, A. D. 1932.

(Seal)

M. J. Moore,
Acting Commissioner of Patents.